United States Patent [19]

Bedford et al.

[11] Patent Number: 4,930,675
[45] Date of Patent: Jun. 5, 1990

[54] METHOD OF FORMING HARD FACINGS ON MATERIALS

[75] Inventors: Gerald M. Bedford, Southsea; Peter J. Richards, Havant, both of United Kingdom

[73] Assignee: Friction Technology Limited, United Kingdom

[21] Appl. No.: 412,418

[22] Filed: Sep. 26, 1989

Related U.S. Application Data

[63] Continuation of Ser. No. 238,345, Aug. 12, 1988, abandoned.

[30] Foreign Application Priority Data

Feb. 17, 1986 [GB] United Kingdom ............... 8603832

[51] Int. Cl.⁵ .............................................. B23K 20/12
[52] U.S. Cl. .................................... 228/112; 228/114; 228/231; 228/2; 228/119; 148/125; 148/905; 427/11
[58] Field of Search .............. 228/110, 112, 114, 115, 228/165, 231, 2, 3.1, 119; 148/125, 905; 427/11; 118/244

[56] References Cited

U.S. PATENT DOCUMENTS

| | | | |
|---|---|---|---|
| 3,537,172 | 11/1970 | Vozneseksky | 228/112 |
| 4,625,401 | 12/1986 | Cvijanovich | 228/112 |

FOREIGN PATENT DOCUMENTS

| | | | |
|---|---|---|---|
| 3219260 | 11/1983 | Fed. Rep. of Germany | 228/112 |
| 2136621 | 12/1972 | France | 228/112 |
| 2383234 | 10/1978 | France | 228/112 |
| 1018412 | 1/1966 | United Kingdom | 228/112 |
| 1102601 | 2/1968 | United Kingdom | 228/112 |

Primary Examiner—Richard K. Seidel
Assistant Examiner—Samuel M. Heinrich
Attorney, Agent, or Firm—Lerner, David, Littenberg, Krumholz & Mentlik

[57] ABSTRACT

A hard facing of preferably a high speed tool steel or a Stellite along the edge of a substrate is produced by mechanical deposition by means of rotary friction surfacing. The combination of high temperatures below the melting points of coating material and substrate and high rates of strain gives rise to a very fine coating microstructure resulting in an edge or valve facing or seat of unexpectedly good mechanical properties and service life.

22 Claims, 8 Drawing Sheets

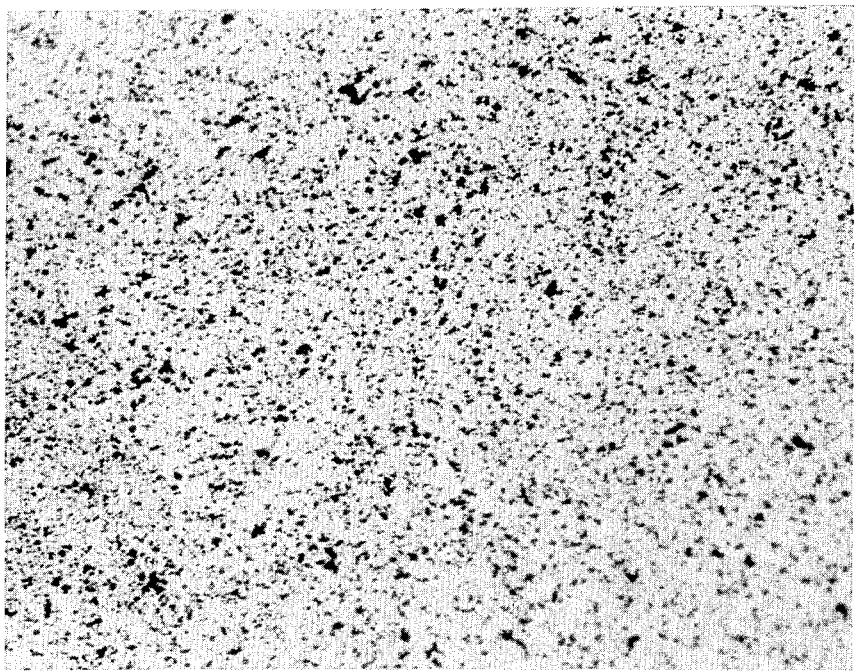
F I G. 9

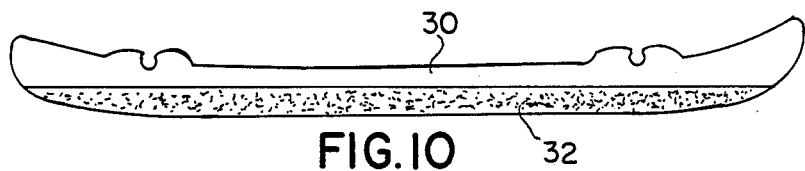
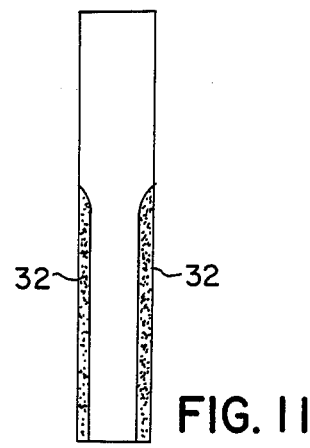
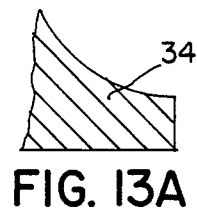
FIG. 13A
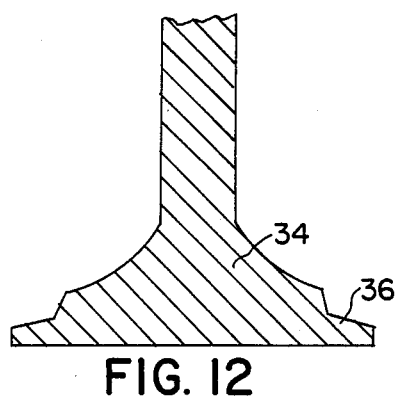
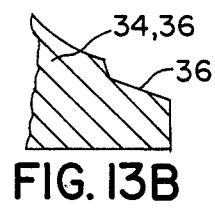
FIG. 13B
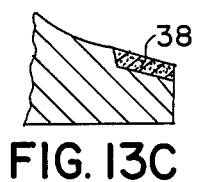
FIG. 13C

METHOD OF FORMING HARD FACINGS ON MATERIALS

This is a continuation of Ser. No. 238,345, filed Aug. 12, 1988, now abandoned.

This invention relates to the formation of hard facings along edges on materials by friction surfacing.

British Patent Specification No. 572789 (Hans Klopstock) describes a method for joining or welding metals in which a rotating rod or bar of weld metal is fed into contact with the metal part or parts to be treated with such continuity of pressure and is moved relatively thereto at such speed that the frictional heat generated causes the end of the rod or bar and the metal to attain welding temperature. The result is that the metal of the rod or bar becomes deposited on the metal under treatment to form a local enlargement or joins two juxtaposed metal parts together or fills in blow-holes or the like.

Hitherto, edge tools such as blades, knives and guillotines have been mad by three routes, one involving carburising and heat-treating the surface of the tool, the second involving brazing or roll-bonding to the tool an insert of high speed tool steel, and a third using solid high speed steel or other typical cutting alloys.

This invention provides a method for applying a hard facing along an edge of a substrate which comprises mechanically depositing by means of rotatory friction surfacing a layer of relatively hard material along the substrate edge and forming a sharp edge in the layer and substrate or grinding said layer to form a wear resistant surface or seat characterised in that the friction surfacing is carried out at a pressure rate of rotation and rate of relative translational movement between the relatively hard material and the substrate such that the friction interface rises from a position in contact with the substrate to a position along the rotating member spaced a small distance from the substrate and so as to deposit on the substrate a homogeneous layer of the relatively hard material more than 0.2 mm thick.

Very preferably the relatively hard material provides metal carbides in a matrix based on a metal selected from the group consisting of iron cobalt and nickel. The process of the invention which operates at high rates of strain and at high temperatures below the melting points of the relatively hard material and the substrate gives rise to very finely divided carbides uniformly distributed in a matrix of very fine microstructure, resulting in unexpectedly good mechanical properties and service life, even when deposited on a mild steel or stainless steel substrate. The method provides for effective use of the relatively hard material because mixing at the interface with the substrate occurs to a minimal extent, and a very good union at the interface is achieved. The coating may be applied to substrates of thickness as low as 3 mm without damage or unacceptable distortion, depending upon the particular hard material and substrate, suitable substrate materials being mild steel and stainless steel.

The articles that may be made by the method of this invention include cutting blades which have shown unexpectedly long service lives and ease of re-grinding, skates, valves and valve seats. Further, a wear resistant face can be formed on the flight edges of extruder screws used extensively in food and plastics industries both as original equipment process and as a reclamation process).

In a further modification the invention may be employed for forming edge tool surfaces on hand tools such as screw drivers and chisels that may benefit from hard facing.

An embodiment of the invention will now be described by way of example only with reference to the accompanying drawings, in which.

Figure 3A:
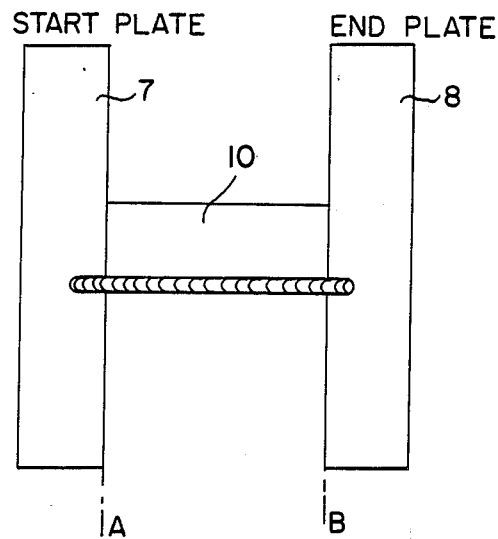
FIGS. 3A and 3B are plans of a workpiece according to the invention showing alternative methods of dealing with the workpiece having regard to the extent of the acceptable coating region.
Figure 3B:
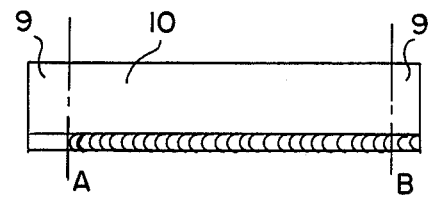
Figure 4:
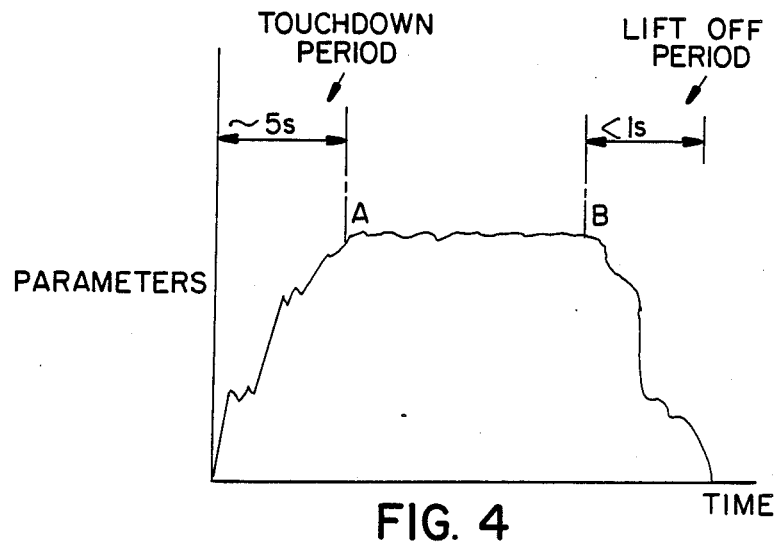

FIG. 4 indicates the way that all relevant parameters are measured and displayed during the coating of the workpiece of FIGS. 3A or 3B, notably pressure and rotational speed of the "mechtrode".

Figure 5:
Figure 6:
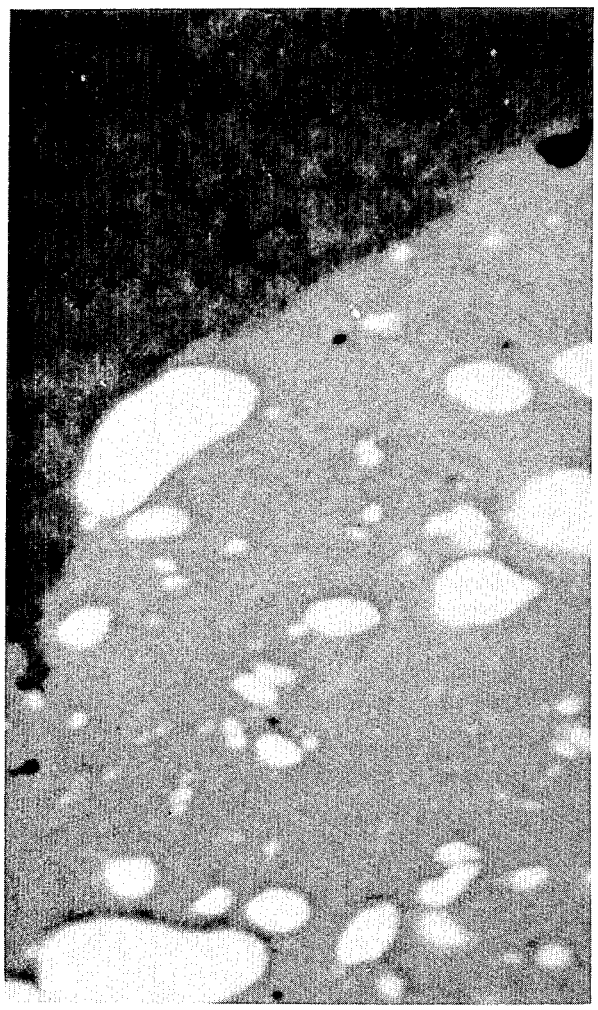
Figure 7:
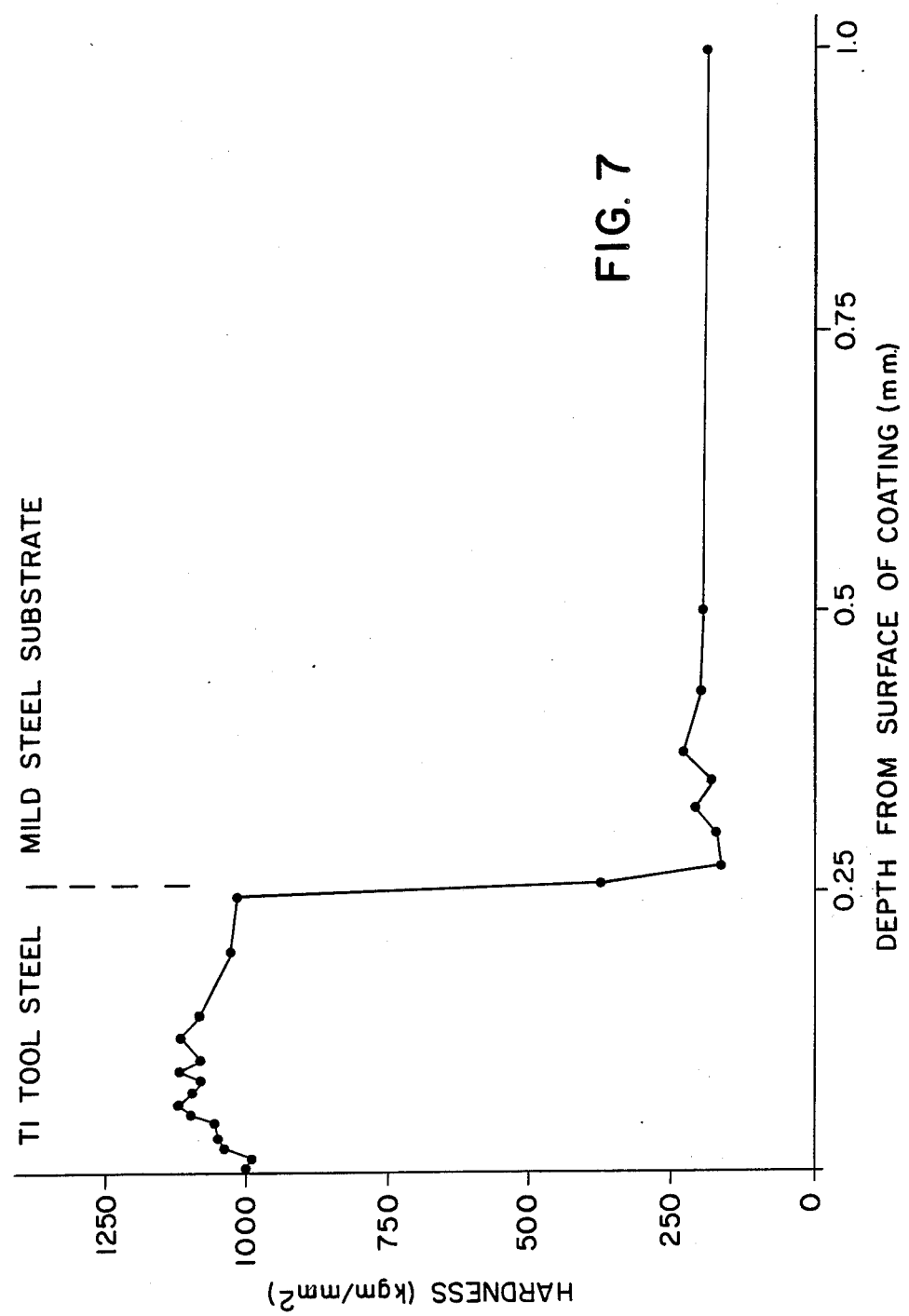
Figure 8:
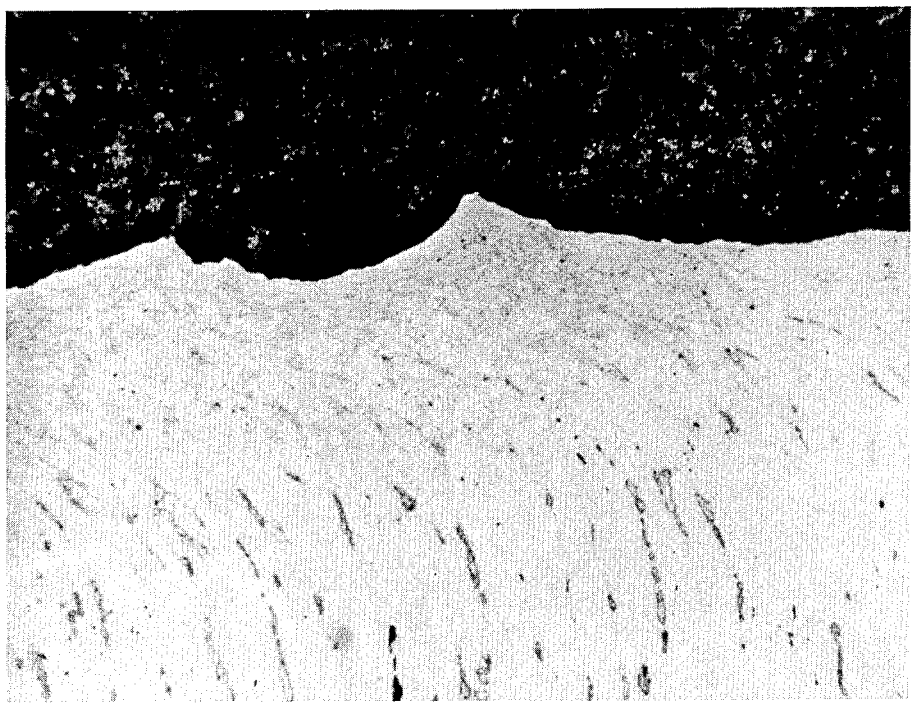

FIGS. 5 and 6 are electron micrographs of T1 tool steel coatings on mild steel;

FIG. 7 is a graph showing hardness against depth from the surface of the coating of a T1 tool steel layer deposited on mild steel;

FIGS. 8 and 9 are micrographs of Stellite on a stainless steel substrate;

FIGS. 10 and 11 are side and end views of a skate provided with a tool steel coating according to the invention;

FIGS. 12 and 13A to 13C are diagrammatic sections of a poppet valve and fragmentary edge sections of the valve showing stages in the formation thereon of a coating according to the invention.

The formation of surface coatings on substrates by friction coating is known. The material from which the coating is formed on existing machines using a round-section bar or rod is between 3 and 25 mm diameter depending upon the application and it is believed that this can be increased to over 40 mm required with an appropriately powerful machine. The bar is rotated at a typical peripheral speed of from 1–2 meters per second under pressure, to form a hot plasticised layer in the bar where it interfaces with the substrate. By moving the substrate which may be a plate or rod across the face of the rotating bar, termed a "mechtrode", there is deposited on the substrate a plasticised layer of thickness from 0.2 mm upwards. Because no melting has taken place, the layer does not suffer from the defects commonly associated with fusion welded and sprayed coatings.

Figure 1:
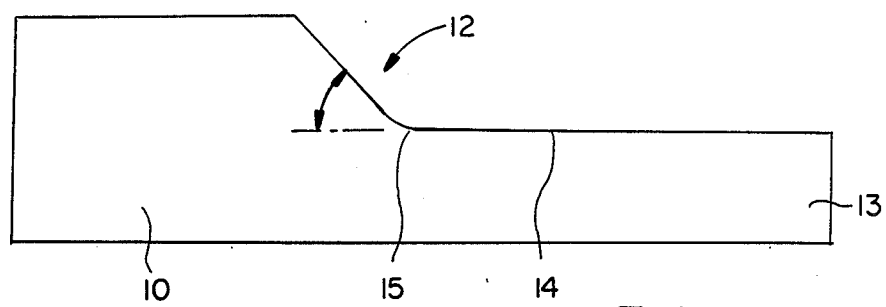
FIG. 1 is a diagrammatic profile of a mild steel workpiece along an edge of which a high speed steel coating is to be formed during the manufacture of an edge according to the process of the invention.

This invention is based on the discovery that hard facings of carbide-containing, iron-based cobalt-based or less commonly nickel-based alloys can usefully be deposited along a milled edge channel of a workpiece. In FIG. 1, a mild steel workpiece 10 is cut to length, and a recess 12 is formed along an edge 13 thereof. The recess 12 is generally of angular profile with its back face inclined at an angle typically from 35 degrees to 55 degrees to the cut face, preferably about 45 degrees and joined to the cut face 14 by a radiused region 15. The angle of the back face of the workpiece takes the natural geometry of the hot plasticised mechtrode material as it progresses along the recess, and the radiused region 15 maintains intimate contact for heat generation continuously across the profile of the groove avoiding development in the finished workpiece of a linear region of poorly bonded coating. The depth and width of the channel 12 will depend on the nature of the workpiece 10 and of the type of blade which it is intended to provide.

Figure 2:
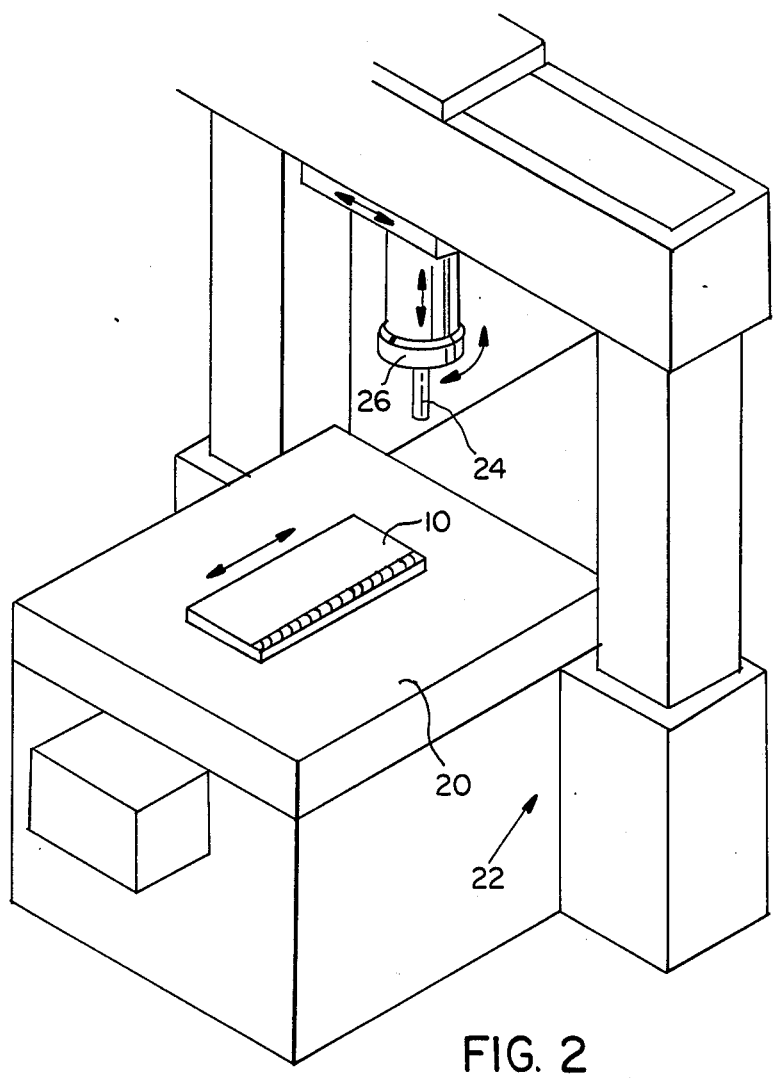
FIG. 2 is an isometric sketch of a friction surfacing machine according to the invention.

The blade 10 is clamped by clamping means (not shown) firmly onto a bed 20 of a coating machine 22 having a mechtrode 24 firmly fixed in a rotary chuck 26. FIG. 2 shows the general machine format with the blade 10 in place for coating. The coating machine will normally be provided with sensors providing inputs to a feedback control loop so that a defined mechtrode pressure in $N/mm^2$, a defined rate of rotation and a defined rate of feed of the mechtrode 24 relative to the workpiece 10 is maintained. A feature of the friction coating process is that the coating parameters are selected to generate the intended heat flow characteristics. Parameters are optimised to generate sufficient heat to enable the friction interface to rise from a position in contact with the substrate 10 to a position along the mechtrode 24 spaced a small distance from the substrate 10. The initial or "touchdown" phase of the coating process in which friction heating of the mechtrode 24 up to its equilibrium condition takes place is important, as is the phase in which the mechtrode 24 is lifted from contact with the blade 10 at the end of the run. In a typical run using a 5 mm thick mild steel blade 10 and a high speed tool steel bar 24 of 10 mm diameter, the touchdown phase will occupy five seconds and the coating phase will occupy 200 seconds, the spindle speed being about 1250 rpm and the workpiece 10 feed rate 4 mm per second the force on the mechtrode 24 being about 12 kN. The result is to produce a coating about 0.7 mm thick more and of length typically 800 mm.

The thickness of the layer produced depends on the material of the mechtrode 24, the diameter of the mechtrode and to a lesser extent the material and thickness of the substrate 10. Thus a 10 mm mechtrode may typically produce a coating in the range 0.2 to 1 mm thick whereas a 25 mm diameter mechtrode may produce a coating in the range 0.5 to 2 mm thick. Any desired thickness may be built up by means of repeated coating. The width of the layer produced will be similar to the diameter of the mechtrode employed. Mechtrodes of diameter up to 50 mm can be employed, wider coatings if required being produced by parallel tracks, eg. in the production of large industrial guillotine blades for the paper and plastics industries.

Referring to FIGS. 3A, 3B and 4, it is seen that the blade 10 has lines A and B defining completion of touchdown and initiation of liftoff respectively. The touchdown period occupies five seconds and the liftoff period is less than 1 second. During the interval between 35 touchdown and liftoff (ie. in the interval between points A and B) a coating having consistent properties is produced. In the variant of FIG. 3A, touchdown and liftoff occur on a start plate 7 and an end plate 8, substantially the whole of the workpiece 10 having an effective coating. In the variant of FIG. 3B, touchdown and liftoff occur at the ends 9 of the workpiece which are subsequently removed.

After the coating has been deposited on the blade 10, a heat treatment step is required in the case of high speed tool steels in order to temper the coating back from its as deposited high hardness.

Typically tempering is carried out for two periods of one hour at a temperature of 560° C. when secondary hardening occurs.

After completion of the coating formation and heat treatment steps the blade 10 is ground along its edge to clean and sharpen the coating. Because the present process does not involve melting, the degree of distortion of the workpiece 10 is much less than in conventional brazing or welding processes.

A significant feature of the process is that it copes with the two different types of hardfacing alloys. Thus when high speed tool steels are used, allotropic transformation takes place to relatively soft austenite at high temperatures which is quenched to hard martensite as a result of the process. In contrast, Stellite type alloys undergo no allotropic change and simply experience high temperature softening to enable coating to take place.

A significant metallurgical advantage is that the alloy is hot worked during coating so that the fine structure resulting has attendant good properties. The resulting microstructure is a very fine array of angular complex carbide particles in a matrix of, in the case of a high speed transformable tool steel, very fine martensite which on subsequent tempering is enhanced by secondary hardening. The size of the carbides in the matrix is such that there are relatively few carbides of size above two microns with a very uniform distribution of the carbides through the matrix, the fineness of the microstructure giving the observed better edge retention properties. Normally high speed tool steels have a much coarser microstructure with large carbide particles in a banded form and a coarse martensitic matrix. Because the austenite which is present at the equilibrium condition of the mechtrode during coating is hot worked at very high strain rates, it has a very fine microstructure which on the immediately following rapid cooling transforms to an equally fine martensitic structure. In the cobalt based alloys the resulting microstructure is uniform with a very uniform array of angular complex carbides in a solid solution matrix of cobalt/chromium.

The invention will now be described with reference to the following Examples.

EXAMPLE 1

A mild steel blade for a knife of a wood planing machine was coated with a 12 mm edge coating of T1 high speed tool steel (18:4:1 type). The coated blade was sectioned, ground, polished and examined in a scanning electron microscope fitted with a back-scatter detector that gives atomic number contrast to the micrographs dark contrast from low atomic number (2) and light areas from high Z regions. In FIG. 5 which is a scanning electron micrograph there may be seen an upper plain region of mild steel connected by a well-defined interface to a high speed tool steel layer which has finely divided uniformly distributed carbides. FIG. 6 is an enlarged interface area of FIG. 5 in back-scatter imaging mode, showing that any interface void (black area) is about one micron in size, such voids being of infrequent occurrence. The homogeneity of matrix is also evident from its uniform appearance. The hardness of the T1 coating normal to the tool surface and a scan across the interface on the polished section were carried out using a Vickers bench microhardness tester. The hardness of the coating and mild steel substrate, measured at 1000 gms, were 860±30 and 173±9 respectively. The scan of harness, measured at 50 gms load, across the interface is plotted in FIG. 7. There is a very sharp drop in hardness at the boundary between the T1 and mild steel indicating that no significant dilution of the coating material at the interface has occurred. The differences in the measured harnesses at 1000 gms and at 50 gms load are believed to be due to the thickness of the coating.

Four 230 mm long blades of this type were fitted into a block of a wood planing machine and after 28,000 meters of softwood had been planed were still in a useable condition. A solid T1 blade has a life of typically 4,000 meters of softwood.

EXAMPLE 2

Blades were manufactured as in Example 1 except that immediately after coating, the blade was immersed in liquid nitrogen for 24 hours followed by two one-hour treatments at 560° C. The resulting blades when fitted to the same machine as in Example 1 were in useable condition after 50,000 meters of softwood had been planed, after which the blades were removed.

EXAMPLE 3

A blade according to Example 1 was re-sharpened by grinding to remove 0.4 mm of material. A conventional T1 blade typically loses 1–2 mm during re-grinding.

EXAMPLE 4

A blade of stainless steel (austenitic 316 type) was edge coated with an 8 mm wide coating of Stellite 6 (Stellite 6 is cobalt/chromium/tungsten/carbon alloy containing C=1, W=5, Cr=26, Co=balance available from Stoody Deloro Stellite of Swindon, UK). The Vickers hardness of Stellite 6 as cast was 410 whereas the deposited coating had a surface Vickers hardness using a 30 Kg load of 665 and a section hardness of 640, the increase in hardness being attributable to the fine carbide distribution and the very fine matrix structure. In FIG. 8 the upper layer is Stellite and the lower layer is the stainless steel substrate; in FIG. 9 the detail of the Stellite 6 coating is seen at high magnification showing a fine uniform distribution of carbides, whereas Stellite 6 deposited by a conventional oxy-acetylene process gives a coarse dendritic structure in which it is difficult to achieve a uniform cutting edge.

EXAMPLE 5

A skater's blade 30 (FIGS. 10, 11) of mile steel is formed along both lower sides with recesses in which BT1 high speed tool steel is deposited to form hard facings 32 as described in FIG. 1, followed by grinding and finishing.

EXAMPLE 6

A poppet valve 34 for an engine exhaust is formed with a peripheral recess 36 into which is deposited a layer 38 of Stellite 6. It is envisaged that other hard facing alloys such as those in the Tristelle range (iron based alloys available from Stoody Deloro Stellite) may be used in place of Stellite 6.

We claim:

1. A method for applying a hard facing along an edge of a relatively soft substrate, said method comprising: forming a recess along the edge of the substrate; rotatably supporting a member of relatively hard material for forming the hard facing, said member having an end face and a rotation axis that passes through said end face; and rotating said member of relative hard material while pressing its end face against the substrate within the recess and bringing about relative translational movement between said member and the substrate so that said member moves along the edge of the substrate within the recess, whereby the relatively hard material is deposited along the edge within the recess by rotatory friction surfacing, the pressure, rate of rotation of said member and rate of relative translational movement between said member and the substrate being such that an interface at which heat is generated by friction moves from a position in contact with the substrate to a position along the rotating member spaced a small distance from the substrate so as to deposit on the substrate within the recess a homogeneous layer of the relatively hard material greater than 0.2 mm thick.

2. A method according to claim 1, further comprising forming a sharp edge in the hard facing and substrate or grinding the hard facing to form a wear-resistant surface or seat.

3. A method according to claim 1 or 2, wherein said member provides metal carbides in a matrix based on a metal selected from the group consisting of iron, cobalt and nickel.

4. A method according to claim 3, wherein said member is of high speed transformable tool steel that becomes applied to the substrate without melting at an austenitising temperature at high rates of strain, the resulting fine microstructure transforming to carbides of size about 2 microns or less uniformly distributed in a very fine martensitic matrix, and tempering the hard facing applied to the substrate to bring about secondary hardening thereof.

5. A method according to claim 4, further comprising maintaining the substrate having the hard facing applied thereto at a cryogenic temperature for a period, and subsequently tempering said hard facing.

6. A method according to claim 3, comprising providing a stainless steel substrate and depositing a relatively hard material which is a cobalt/chromium/tungsten/carbon alloy which becomes deposited on the substrate as a layer of very finely divided carbides in a matrix, said layer having a hardness greater than the hardness of said material as cast.

7. A method according to claim 1, comprising forming first and second edges disposed back-to-back on the substrate and depositing hard facing material along each said edge within a recess.

8. A method according to claim 1, comprising providing a substrate having an edge in the form of a closed loop and depositing the hard facing material along said edge.

9. A method according to claim 1, wherein the substrate includes cutting blades, punches, dyes, valves or valve seats.

10. A method for applying a hard facing along an edge of a relatively soft substrate, said method comprising: rotatably supporting a member of relatively hard material for forming the hard facing, said member having an end face and a rotation axis that passes through the end face; rotating the member of relatively hard material while pressing its end face against a substrate during an initial touchdown phase; progressively increasing pressure applied by said member of relatively hard material during said initial touchdown phase so as to cause an interface at which heat is generated by friction to move from a position in contact with said substrate to a position along the rotating member spaced at least 0.2 mm from the substrate; maintaining rotation of said member of relatively hard material while pressing its end face against a relatively soft substrate and bringing about relative translational movement between said member and the relatively soft substrate so that said member moves along the edge of the relatively soft substrate, whereby the relatively hard material is deposited along the edge of the relatively soft substrate by rotatory friction surfacing, the pressure, rate of rotation of said member and rate of relative translational movement between said member and the relatively soft substrate being such that the interface at which heat is generated by friction is maintained at a position spaced at least 0.2 mm from the relative soft substrate so as to deposit on the relative soft substrate a homogeneous layer of the relatively hard material greater than 0.2 mm thick.

11. A method according to claim 10, further including forming a sharp edge in the hard facing and the relatively soft substrate or grinding the hard facing to form a wear resistant surface or seat.

12. A method according to claim 10, further including forming a recess along the edge of the relatively soft substrate and depositing the hard facing in the recess.

13. A method according to claim 10 or 12, wherein said substrate against which said member is pressed during the initial touchdown phase comprises the relatively soft substrate.

14. A method according to claim 10 or 12, wherein said substrate against which said member is pressed during the initial touchdown phase comprises a substrate other than the relative soft substrate.

15. A method according to claim 14, wherein the substrate and relative soft substrate have the same or different hardness.

16. A method according to claim 10, further including removing a surface portion of the applied hard facing to form a finished surface thereat.

17. A method for applying a hard facing along an edge of a relatively soft substrate, said method comprising: supporting in end to end abutting relationship a start plate, a relatively soft substrate and an end plate; rotatably supporting a member of relatively hard material for forming the hard facing, said member having an end face and a rotation axis that passes through said end face; rotating said member of relatively hard material while pressing its end face against the start plate and bringing about relative translational movement between said member and the start plate so that said member moves along the start plate and the relatively hard material is deposited along the start plate by rotary friction surfacing, the pressure being progressively increased and the rate of rotation of said member and rate of relative translational movement between said member and the start plate being such than an interface at which heat is generated by friction has moved from a position in contact with the start plate to a position along the rotating member spaced at least 0.2 mm from the start plate no later than when said member of relatively hard material reaches an edge of the start plate abutting the relative soft substrate; maintaining rotation of said member of relatively hard material while pressing its end face against the relative soft substrate and bringing about relative translational movement between said member and the relative soft substrate so that said member moves along the edge of the relative soft substrate, whereby the relatively hard material is deposited along the edge of the relative soft substrate by rotary friction surfacing, the pressure, rate of rotation of said member and rate of relative translational movement between said member and the relative soft substrate being such that the interface at which heat is generated is maintained at a substantially constant distance along the rotating member spaced from the relatively soft substrate so as to deposit on the relative soft substrate a homogeneous layer of the relatively hard material greater than 0.2 mm thick; and maintaining contact between said member of relatively hard material and the relatively soft substrate until said member has passed onto the end plate.

18. A method according to claim 17, further including forming a sharp edge in the hard facing and relative soft substrate or grinding the hard facing to form a wearer-resistant surface or seat.

19. A method according to claim 17, further including forming a recess along the edge of the relative soft substrate and depositing the hard facing in the recess.

20. A method according to claim 17, further including removing a surface portion of the applied hard facing to form a finished surface thereat.

21. A method according to claim 17, wherein the start plate is reusable.

22. A method according to claim 17 or 21, wherein the end plate is reusable.

* * * * *

UNITED STATES PATENT AND TRADEMARK OFFICE
CERTIFICATE OF CORRECTION

PATENT NO. : 4,930,675

DATED : June 5, 1990

INVENTOR(S) : Gerald M. Bedford, et al

It is certified that error appears in the above-identified patent and that said Letters Patent is hereby corrected as shown below:

```
Column 1, line 22, "mad" should read --made--.
Column 4, line 63, "harness" should read --hardness--.
Column 4, line 68, "harnesses" should read --hardnesses--.
Column 5, line 43, "mile" should read --mild--.
Column 5, line 63, "relative" should read --relatively--.
Column 7, line 3, "rotatory" should read --rotary--.
Column 7, lines 26 and 28, "relative" should read
   --relatively--.
Column 8, lines 10, 12, 14, 17, 21, 25, 32 and 36,
   "relative" should read --relatively--.
```

Signed and Sealed this

Twenty-fourth Day of September, 1991

*Attest:*

HARRY F. MANBECK, JR.

*Attesting Officer*     *Commissioner of Patents and Trademarks*